United States Patent
Allen et al.

(10) Patent No.: US 7,974,895 B1
(45) Date of Patent: Jul. 5, 2011

(54) SYSTEM AND METHOD FOR DEVELOPING FINANCE RATE INFORMATION

(75) Inventors: Debora L. Allen, Tampa, FL (US); Andrew Arce, Smithtown, NY (US); Debra Ann Hogan, Wantaugh, NY (US); Mark Gregory Anderson, Baldwin, NY (US); Michael Joseph LaForgia, Smithtown, NY (US); Ashish Prabhakar, Bronx, NY (US)

(73) Assignee: JP Morgan Chase Bank, New York, NY (US)

( * ) Notice: Subject to any disclaimer, the term of this patent is extended or adjusted under 35 U.S.C. 154(b) by 925 days.

(21) Appl. No.: 11/078,043

(22) Filed: Mar. 11, 2005

Related U.S. Application Data

(60) Provisional application No. 60/588,866, filed on Jul. 16, 2004.

(51) Int. Cl.
*G06Q 40/00* (2006.01)
(52) U.S. Cl. .......................................... 705/35; 705/28
(58) Field of Classification Search .................. 705/35, 705/38
See application file for complete search history.

(56) References Cited

U.S. PATENT DOCUMENTS

| | | |
|---|---|---|
| 3,634,669 A | 1/1971 | Wyckoff et al. |
| 4,346,442 A | 8/1982 | Musmanno |
| 4,355,372 A | 10/1982 | Goldberg |
| 4,376,978 A | 3/1983 | Musmanno |
| 4,597,046 A | 6/1986 | Musmanno et al. |
| 4,598,367 A | 7/1986 | DeFrancesco et al. |
| 4,642,768 A | 2/1987 | Roberts |
| 4,674,042 A | 6/1987 | Hernandez et al. |
| 4,674,044 A | 6/1987 | Kalmus et al. |
| 4,736,294 A | 4/1988 | Gill et al. ...................... 364/408 |
| 4,739,478 A | 4/1988 | Roberts et al. |
| 4,760,604 A | 7/1988 | Cooper |
| 4,774,663 A | 9/1988 | Musmanno et al. |
| 4,831,526 A | 5/1989 | Luchs |
| 4,859,187 A | 8/1989 | Peterson |
| 4,866,634 A | 9/1989 | Reboh |
| 4,897,811 A | 1/1990 | Scofield |
| 4,972,504 A | 11/1990 | Daniel, Jr. |
| 5,041,972 A | 8/1991 | Frost |
| 5,093,907 A | 3/1992 | Hwong et al. |
| 5,220,500 A | 6/1993 | Baird |

(Continued)

FOREIGN PATENT DOCUMENTS

EP   0597316   5/1994

(Continued)

OTHER PUBLICATIONS

Financial Express Jun. 8, 2002. All set for a smooth ride. Journal Code WFEX Language : English.*

(Continued)

*Primary Examiner* — Ella Colbert
*Assistant Examiner* — John A Anderson
(74) *Attorney, Agent, or Firm* — Lowenstein Sandler PC

(57) ABSTRACT

A system and method for providing finance rates are provided. According to the system and method, rate request information is acquired. Once the rate request information is acquired, it may be stored in a tracking database for statistical purposes. The acquired request information is submitted to a rate generation system that generates rates based at least upon the acquired request information. The generated rates are used to populate a template rate sheet that is then output in response to a rate request.

40 Claims, 5 Drawing Sheets

U.S. PATENT DOCUMENTS

| | | | |
|---|---|---|---|
| 5,227,874 A | 7/1993 | Von Kohorn | |
| 5,231,571 A | 7/1993 | D'Agostino | |
| 5,245,535 A | 9/1993 | Weiss et al. | |
| 5,278,751 A | 1/1994 | Adiano | |
| 5,297,032 A | 3/1994 | Trojan et al. | |
| 5,321,933 A | 6/1994 | Seifert et al. | |
| 5,381,470 A | 1/1995 | Cambray et al. | |
| 5,396,621 A | 3/1995 | MacGregor et al. | |
| 5,444,844 A | 8/1995 | Inoue | |
| 5,481,647 A | 1/1996 | Brody | |
| 5,490,060 A | 2/1996 | Malec | |
| 5,502,805 A | 3/1996 | Anderson et al. | |
| 5,523,942 A | 6/1996 | Tyler | |
| 5,550,734 A | 8/1996 | Tater | |
| 5,551,021 A | 8/1996 | Harada | |
| 5,583,778 A | 12/1996 | Wind | |
| 5,592,590 A | 1/1997 | Jolly | |
| 5,603,025 A | 2/1997 | Tabb | |
| 5,606,496 A | 2/1997 | D'Agostino | |
| 5,611,052 A | 3/1997 | Dykstra | |
| 5,615,109 A | 3/1997 | Eder | |
| 5,615,341 A | 3/1997 | Srikant | |
| 5,623,591 A | 4/1997 | Cseri | |
| 5,644,727 A | 7/1997 | Atkins | |
| 5,649,116 A | 7/1997 | McCoy | |
| 5,655,085 A | 8/1997 | Ryan | |
| 5,657,437 A | 8/1997 | Bishop et al. | |
| 5,657,460 A | 8/1997 | Egan et al. | |
| 5,664,127 A | 9/1997 | Anderson et al. | |
| 5,671,363 A | 9/1997 | Cristofich et al. | |
| 5,675,746 A | 10/1997 | Marshall | |
| 5,689,650 A | 11/1997 | McClelland et al. | |
| 5,717,865 A | 2/1998 | Stratmann | |
| 5,721,847 A | 2/1998 | Johnson | |
| 5,727,161 A | 3/1998 | Purcell, Jr. | |
| 5,732,397 A | 3/1998 | DeTore | |
| 5,758,328 A | 5/1998 | Giovannoli | |
| 5,764,923 A | 6/1998 | Tallman et al. | |
| 5,765,144 A | 6/1998 | Larche | |
| 5,768,158 A | 6/1998 | Adler et al. | |
| 5,774,878 A | 6/1998 | Marshall | |
| 5,774,883 A * | 6/1998 | Andersen et al. | 705/38 |
| 5,799,286 A | 8/1998 | Morgan et al. | |
| 5,802,502 A | 9/1998 | Gell | |
| 5,819,237 A | 10/1998 | Garman | |
| 5,842,178 A | 11/1998 | Giovannoli | |
| 5,848,400 A | 12/1998 | Chang | |
| 5,852,811 A | 12/1998 | Atkins | |
| 5,870,721 A | 2/1999 | Norris | |
| 5,873,096 A | 2/1999 | Lim | |
| 5,875,437 A | 2/1999 | Atkins | |
| 5,878,258 A | 3/1999 | Pizi | |
| 5,878,403 A | 3/1999 | Agrawal | |
| 5,913,202 A | 6/1999 | Motoyama | |
| 5,918,217 A | 6/1999 | Maggioncalda | |
| 5,920,848 A | 7/1999 | Schutzer | |
| 5,930,775 A | 7/1999 | McCauley | |
| 5,940,811 A | 8/1999 | Norris | |
| 5,940,812 A | 8/1999 | Tengel et al. | |
| 5,950,175 A | 9/1999 | Austin | |
| 5,963,953 A | 10/1999 | Cram et al. | |
| 5,970,467 A | 10/1999 | Alavi | |
| 5,974,396 A | 10/1999 | Anderson | |
| 5,978,779 A | 11/1999 | Stein et al. | |
| 5,983,206 A | 11/1999 | Oppenheimer | |
| 5,987,434 A | 11/1999 | Libman | |
| 5,991,741 A | 11/1999 | Speakman et al. | |
| 5,995,942 A | 11/1999 | Smith et al. | |
| 5,999,907 A | 12/1999 | Donner | |
| 6,008,817 A | 12/1999 | Gilmore, Jr. | |
| 6,009,415 A | 12/1999 | Shurling et al. | |
| 6,018,722 A | 1/2000 | Ray et al. | |
| 6,021,397 A | 2/2000 | Jones et al. | |
| 6,026,370 A | 2/2000 | Jermyn | |
| 6,029,139 A | 2/2000 | Cunningham et al. | |
| 6,029,195 A | 2/2000 | Herz | |
| 6,032,125 A | 2/2000 | Ando | |
| 6,044,371 A | 3/2000 | Person et al. | |
| 6,055,510 A | 4/2000 | Henrick | |
| 6,064,985 A | 5/2000 | Anderson | |
| 6,070,147 A | 5/2000 | Harms et al. | |
| 6,073,115 A | 6/2000 | Marshall | |
| 6,076,072 A | 6/2000 | Libman | |
| 6,078,892 A | 6/2000 | Anderson et al. | |
| 6,078,901 A | 6/2000 | Ching | |
| 6,088,686 A * | 7/2000 | Walker et al. | 705/38 |
| 6,092,050 A | 7/2000 | Lungren et al. | |
| 6,097,391 A | 8/2000 | Wilcox | |
| 6,108,641 A | 8/2000 | Kenna et al. | |
| 6,122,623 A | 9/2000 | Garman | |
| 6,154,731 A | 11/2000 | Monks et al. | |
| 6,173,270 B1 | 1/2001 | Cristofich et al. | |
| 6,185,582 B1 | 2/2001 | Zellweger et al. | |
| 6,188,403 B1 | 2/2001 | Sacerdoti et al. | |
| 6,188,405 B1 | 2/2001 | Czerwinski et al. | |
| 6,188,993 B1 | 2/2001 | Eng et al. | |
| 6,195,092 B1 | 2/2001 | Dhond et al. | |
| 6,199,077 B1 | 3/2001 | Inala et al. | |
| 6,202,053 B1 | 3/2001 | Christiansen et al. | |
| 6,205,453 B1 | 3/2001 | Tucker et al. | |
| 6,212,494 B1 | 4/2001 | Boguraev | |
| 6,222,557 B1 | 4/2001 | Pulley, IV et al. | |
| 6,236,978 B1 | 5/2001 | Tuzhilin | |
| 6,243,093 B1 | 6/2001 | Czerwinski et al. | |
| 6,249,775 B1 | 6/2001 | Freeman et al. | 705/36 |
| 6,256,649 B1 | 7/2001 | Mackinlay et al. | |
| 6,263,320 B1 | 7/2001 | Danilunas et al. | 705/35 |
| 6,269,346 B1 | 7/2001 | Cristofich et al. | |
| 6,271,863 B1 | 8/2001 | Bose et al. | |
| 6,278,981 B1 | 8/2001 | Dembo et al. | |
| 6,282,551 B1 | 8/2001 | Anderson et al. | |
| 6,311,144 B1 | 10/2001 | Abu El Ata | |
| 6,317,726 B1 | 11/2001 | O'Shaughnessy | |
| 6,317,750 B1 | 11/2001 | Tortolani et al. | |
| 6,321,212 B1 | 11/2001 | Lange | |
| 6,330,551 B1 | 12/2001 | Burchetta et al. | |
| 6,349,290 B1 | 2/2002 | Horowitz et al. | |
| 6,349,291 B1 | 2/2002 | Varma | |
| 6,360,188 B1 | 3/2002 | Freidman et al. | |
| 6,363,393 B1 | 3/2002 | Ribitzky | |
| 6,405,204 B1 | 6/2002 | Baker et al. | |
| 6,452,613 B1 | 9/2002 | Lefebvre et al. | |
| 6,490,569 B1 | 12/2002 | Grune et al. | |
| 6,496,832 B2 | 12/2002 | Chi et al. | |
| 6,502,080 B1 | 12/2002 | Eichorst et al. | 705/400 |
| 6,513,018 B1 | 1/2003 | Culhane | |
| 6,597,379 B1 | 7/2003 | Morris et al. | |
| 6,601,044 B1 | 7/2003 | Wallman | |
| 6,725,257 B1 | 4/2004 | Cansler et al. | 709/219 |
| 6,741,975 B1 | 5/2004 | Nakisa et al. | |
| 6,850,923 B1 | 2/2005 | Nakisa et al. | |
| 6,985,880 B1 | 1/2006 | Hodgdon et al. | |
| 2001/0011243 A1 | 8/2001 | Dembo et al. | |
| 2001/0056398 A1 | 12/2001 | Scheirer | |
| 2002/0007330 A1 | 1/2002 | Kumar et al. | |
| 2002/0019791 A1 | 2/2002 | Goss et al. | |
| 2002/0019803 A1 | 2/2002 | Muller | |
| 2002/0059139 A1 | 5/2002 | Evans | |
| 2002/0067373 A1 | 6/2002 | Roe et al. | |
| 2002/0073005 A1 | 6/2002 | Welnicki et al. | |
| 2002/0078086 A1 | 6/2002 | Alden et al. | |
| 2002/0111850 A1 | 8/2002 | Smrckas et al. | |
| 2002/0111890 A1 | 8/2002 | Sloan et al. | |
| 2002/0133383 A1 | 9/2002 | Chao et al. | |
| 2002/0147668 A1 | 10/2002 | Smith et al. | |
| 2002/0152157 A1 * | 10/2002 | Stoyanov et al. | 705/38 |
| 2002/0198797 A1 | 12/2002 | Cooper et al. | |
| 2003/0018492 A1 | 1/2003 | Carlson | |
| 2003/0028466 A1 | 2/2003 | Jenson et al. | |
| 2003/0061132 A1 | 3/2003 | Yu, Sr. et al. | |
| 2003/0061137 A1 | 3/2003 | Leung et al. | |
| 2003/0093351 A1 | 5/2003 | Sarabanchong | |
| 2003/0149659 A1 * | 8/2003 | Danaher et al. | 705/38 |
| 2003/0212628 A1 | 11/2003 | Kuttan et al. | |
| 2003/0216965 A1 | 11/2003 | Libman | |
| 2003/0229582 A1 | 12/2003 | Sherman et al. | |
| 2004/0015424 A1 * | 1/2004 | Cash et al. | 705/35 |

| | | | |
|---|---|---|---|
| 2004/0030626 A1 | 2/2004 | Libman |
| 2004/0039588 A1 | 2/2004 | Libman |
| 2004/0054610 A1 | 3/2004 | Amstutz et al. |
| 2004/0236641 A1 | 11/2004 | Abbott et al. |
| 2004/0267651 A1 | 12/2004 | Jenson et al. |
| 2005/0004855 A1 | 1/2005 | Jenson et al. |
| 2005/0004856 A1 | 1/2005 | Brose et al. |
| 2005/0010510 A1 | 1/2005 | Brose et al. |
| 2005/0027632 A1 | 2/2005 | Zeitoun et al. |
| 2005/0060252 A1 | 3/2005 | Doddington |
| 2005/0144108 A1 | 6/2005 | Loeper |

FOREIGN PATENT DOCUMENTS

| | | |
|---|---|---|
| JP | 2002-163589 | 6/2002 |
| WO | 99/27479 | 6/1999 |
| WO | 00/02256 | 1/2000 |
| WO | 02/069212 | 9/2002 |

OTHER PUBLICATIONS

Asch; How The RMA/Fair ISSAC Credit-Scoring Model Was Built, Journal of Commercial Lending, vol. 77, No. 10, Jun. 1995, pp. 10-16.

Taylor et al.; Card Issuers Turn to Scoring As They Face Increasing Risk, Financial Services Report, vol. 8, No. 15, Jul. 24, 1991, p. 1.

Roger et al.; A Credit Scoring Model to Evaluate the Credit Worthiness of Credit Card Applicants, Developments in Marketing Science, vol. 5, 1982.

Hickman; Using Software to Soften Big-Time Competition, Bank Systems and Technology, vol. 31, No. 8, Jun. 1994, pp. 38-40.

Sullivan; Scoring Borrower Risk, Mortage Banking, vol. 55, No. 2, Nov. 1994, pp. 94-98.

Jameson; Expanding Risk Management Strategies: Key to Future Survival, Credit World, vol. 84, No. 5, May 1996, pp. 16-18.

Friedland; Credit Scoring Digs Deeper Into Data, Credit World, vol. 84, No. 5, May 1996, pp. 19-23.

Credit Scoring New Markets, Bank Technology News, vol. 9, No. 7, Jul. 1996, p. 1.

Carey; The Sub-Prime Credit Market: Identifying Good Risks for Unsecured Cards, Credit World, vol. 85, No. 1, Sep. 1996, pp. 13-15.

Opportunity Knocks At Scoring'S Door, Collection and Credit Risk, vol. 2, No. 4, Apr. 1997, p. 53.

Makuch; Managing Consumer Credit Delinquency in the US Economy: A Multi-Billion Dollar Management Science Application, Interfaces, Feb. 1992, pp. 90-109.

Portner; There Must Be a Better Way, Mortgage Banking, vol. 53, No. 2, Nov. 1, 1992, pp. 12-22.

Product Data Integration Technologies, Inc., Step Integratin Authors, Printed on Apr. 26, 1999.

Freemarkets, Printed on Apr. 26, 1999.

At Your Request, www.wingspanbank.com, Sep. 28, 1999.

Meredith; Internet Bank Moves Closer to Virtual Reality, USA Today, May 5, 1995.

CSU/DSU (Channel Service Unit/Data Service Unit), CTI (Computer-Telephony Integration), pp. 208-210.

Kneis; Hedge Fund Strategies: A Primer, Canadianhedgewatch, p. 3.

Derivatives Primer, CEIBA, Association for Financial Professionals, Committee on Investment of Employee Benefit Assets, Dec. 2001.

Hedge Fund Primer—The Basics, KSP Capital Management LLC, information@KSPcapital.com, Printed Jul. 24, 2002, 18 Pages.

Armstrong; Fund of Funds: Perfect Solution or Dangerous Shortcut?, Investor Solutions, Inc., www.investorsolutions.com, Printed Jul. 24, 2002.

Hedge Fund Primer About Fund of Funds, Links Securities LLC, www.hedgefund.net/prime_fof.php3, 2002, 2 Pages.

Why a Fund of Funds?, Altegris Investments, www.managedinvestments.com/hedge_fund_of_funds, Printed Jul. 24, 2002.

Trading and Capital-Markets Activities Manual, Instrument Profiles: Structured Notes, Federal Reserve System, The Turin Group, www.toerien.com/books/manual/4040.htm, Printed Jul. 24, 2002, 14 Pages.

Primer: Derivatives Instruments, Derivatives Study Center, www.econstrat.org/dscinstruments.htm, Printed Jul. 24, 2002, 8 Pages.

Pourmokhtar; A Hedge Fund Primer Version 0.1, www.EMF.net/?farzin/hedgefund.html, Printed Jul. 24, 2002, 5 Pages.

Huddling With William Bernstein: Small Town Doctor, Investing PRO.

Bogle; Mutual Funds at the Millennium: Fund Directors and Fund Myths, The Vanguard Group to the '40 Act Institute of PLI (Practicing Law Institute), New York, NY, May 15, 2000, 15 Pages.

Quinn; Credit Card Issuers Keeping a Closer Watch on How You Pay Bills, Washington Post, Staying Ahead, Business Section P6, Apr. 25, 1988, 1 Page.

Spirer; When Bad Credit Behavior Becomes the Norm, Credit World, vol. 85, Iss. 6, Jul./Aug. 1997, p. 18.

Markese; Can You Trust Mutual Fund Rankings?, Consumers' Research Magazine, vol. 76, No. 10, Research Library, Oct. 1993, p. 20.

McLaughlin; Tapping Web to Search for Right Fund—Fundprofiler Speeds Search, Boston Herald, Boston, MA, Dec. 16, 1999, p. 70.

Cumby et al.; Evaluating the Performance of International Mutual Funds, The Journal of Finance, vol. 45, No. 2, Jun. 1990, pp. 497-521.

Gottfried et al.; Graphical Definitions: Making Spreadsheets Visual Through Direct Manipulation and Gestures, Visual Languages, 1997, Proceedings, 1997 IEEE Symposium on, Sep. 23-26, 1997, pp. 246-253, Abstract.

GS-CALC 6.0.1.1.; JPS Development; http://download.com, Printed Sep. 3, 2003.

Buchner et al.; HOTDOC: A Flexible Framework for Spatial Composition, Visual Languages, 1997, Proceedings, 1997 IEEE Symposium, Abstract, Sep. 23-26, 1997, pp. 92-99.

Snyder et al.; Identifying Design Requirements Using Analysis Structures, Aerospace and Electronics Conference, 1991, NAECON, 1991, vol. 2, Abstract, May 20-24, 1991, pp. 786-792.

Davenport et al.; Numbers-A Medium That Counts [Spreadsheet Software]; Computer Graphics and Applications; IEEE; vol. 11; Issue 4; Abstract, Jul. 1991, pp. 39-44.

Stolte et al.; POLARIS: A System for Query, Analysis, and Visualization of Multidimensional Relational Databases; Visualization and Computer Graphics; IEEE Transactions on; vol. 8; Issue 1; Abstract, Jan./Mar. 2002, pp. 52-65.

Chi et al.; Principles for Information Visualization Spreadsheets; Computer Graphics and Applications; IEEE; vol. 18; Issue 4; Abstract, Jul./Aug. 1998, pp. 92-99.

Spreadsheet Mapper; www.panopticon.com., Printed Oct. 1, 2003.

TCS 4.20; Telsys SAS; http://download.com, Printed Sep. 30, 2003.

Spoerri; Visual Tools for Information Retrieval; Visual Languages; 1993; Proceedings; 1993 IEEE Symposium on; pp. 160-168; Abstract.

Internet; Lending Tree, Mortgage Apply Online in Minutes, www.lendingtree.com, 7 Pages, Printed Feb. 1, 1999.

Storms, Phillip; Using Mortgage Credit to Achieve Client Objectives, Journal of Financial Planning, ISSN/ISBN: 10403981; Proquest Document ID:10403981; Denver: vol. 9; Issue 5; 9 Pages, Oct. 1996.

* cited by examiner

Fig. 3                                             300

| Program Development Request | | | | | |
|---|---|---|---|---|---|
| Requestor Information | Requestor Name Jeff Doe —301 Request # 55555 —302 Promotional Code 5555 —304 | | | 303— | Request Location NJ |

| Program Type | 305—State Standard   X 306—Special 307—Manufacturer   X | | Make   Saturn Model   SL2 | 308 |
|---|---|---|---|---|

| Program Details | Region- NE SE SW MW W | | 309 | Start date | 7/15/2004 | 310 |
|---|---|---|---|---|---|---|
| | Regional, State, Territory, DRM | | | End date | 8/31/2004 | |
| | NJ | | | | | |

| | Discount to Apply | | 312 313 | 311 | Model Year(s)   2005-2002 | 308 |
|---|---|---|---|---|---|---|
| | E-contracting | X | 314 | | Terms   24 36 48 60 72 Other All | |
| | Dealer Track | X | 315 | | | |
| | Chase Express | X | 316 | | FICO Tiers | 318 |
| | Big Ticket | X | 317 | | 700+   X | |
| | Super Luxury | X | | | 680-660   X | |
| | | | | | 659-640   X | |
| | | | | | 639-620 | |
| | | | | | 620- 0 | |
| | | | | | All | |

| Financial Impact  319 | Expected volume | $5M | Increase | X | Decrease | |
|---|---|---|---|---|---|---|
| | Expected Yield Impact | 2bp | Increase | | Decrease | X |

| | 322 | 320 | 321 |
|---|---|---|---|
| Communication | Special Visual Instructions | Channel | Approval |
| | Presidents day | Fax   X | Regional Manager   AP |
| | Winter | E-Mail | Marketing Manager   AP |
| | Spring | Web | Product Manager   AP |
| | 4th of July | PDA | Financial Manager   AP |
| | Fall | | Legal   NA |
| | Summer   X | | |

Fig. 4    400

NEW JERSEY

Please submit your applications via DealerTrack.com or fax to (800) 555-5555
Effective on Contracts dated July 15th until further notice
Contracts dated on or before July 14 will be honored at the previous rate if received for funding by July 21
 MAXIMUM MARKUP NOW 2.5 POINTS 
BALLOON PRICING: ADD 3.00 FOR NEW ONLY

| New, Used & Demo | | TIER 1  700+ | TIER II  680-699 | TIER III  660-679 | TIER IV  620-659 |
|---|---|---|---|---|---|
| Model Year(s) | Term | Standard Rate | Standard Rate | Standard Rate | Standard Rate |
| 2005 - 2004 | 60  63  66  72 | 4.29  4.29  4.79  5.34 | 4.74  4.74  5.24  5.79 | 5.04  5.04  5.54  6.09 | 10.32  N/A  N/A  N/A |
| Maximum Advance up to 60 mo  66 mo  72 mo | | 125%  110% | 125%  110% | 120%  110% | 110%  n/a |
| 2003 | 60  63  66  72 | 4.39  4.39  4.89  5.44 | 4.84  4.84  5.34  5.89 | 5.14  N/A  N/A  N/A | 10.47  N/A  N/A  N/A |
| Maximum Advance up to 60 mo  66 mo  72 mo | | 120%  110% | 120%  110% | 115%  n/a | 105%  n/a |

*: BELOW 620 IS AN EXCEPTION

Maximum advance + TT&L + GAP + Service Contract + CL A&H only.

| Advance | Service Contracts | GAP |
|---|---|---|
| New advance based on factory invoice  Used based on NADA Trade-in & include TT&L | New = $1,500 or 7% of MSRP, whichever is greater  USED = $2,500 or 7% of Sales Price, whichever is greater | Maximum GAP allowance = $549  or state max, whichever is less |

Rate Buy Down available - Great for Advertising! See worksheet for assistance.

| Available Discounts |
|---|
| .25% Big Ticket Discount - For any amount financed over $25,000 ALL tiers and ALL Models |
| .15% Chase Express - Entered through Dealertrack and manual Must meet guidelines |

| Flat Fees |
|---|
| New & Used Retail & New Balloon contracts purchased at the buy rate will earn the following flat fee: |

| Amount Financed | Flat Fee |
|---|---|
| $30,000+ | $300 |
| $25,000 - $29,999 | $250 |
| $15,000 - $24,999 | $200 |
| $10,000 - $14,999 | $100 |

New and Improved 90 DAY DEFERMENT Program available for 700 + customers.
See Program Check List. Standard Rates apply.

COMBINE AVAILABLE DISCOUNTS TO LOWER RATES UP TO 40%

Ask your Dealer Relationship Manager about...
... e-contracting discounts, home equity and mortgage discounts as well as lower rates on 640-699 qualifying customers.

BUREAU SCORES WILL BE DETERMINED FROM TRANSUNION EMPIRICA/AUTO SPECIFIC 98

Minimum amount financed up to 60 months is $7,000.
Minimum amount financed on Extended terms is $15,000.
Minimum amount financed on 73+ mos is $25,000.
Maximum Mileage At Inception is 90,000
Business Applications WITHOUT an individual co-buyer is automatically a Tier 2
Maximum rate mark-up is 2.5% above the buy rate.
Any Discrepancies with Dealer Reserve must be resolved within 90 days of Funding For Sales Call:    FAX APPLICATIONS: 1-800-555-5555

| John Doe | Bergen, Passaic & Hudson | 555-555-5555 |
| Jane Doe | Sussex, Essex, Union, Morris & Warren | 555-555-5555 |
| James Doe | Hunterdon, Somerset, Middlesex & Monmouth | 555-555-5555 |
| Jen Doe | Southern New Jersey | 555-555-5555 |

SYSTEM AND METHOD FOR DEVELOPING FINANCE RATE INFORMATION

CROSS-REFERENCE TO RELATED APPLICATION

This application claims the benefit of U.S. Provisional Application No. 60/588,866, filed Jul. 16, 2004, the entire disclosure of which is hereby incorporated herein by reference.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

This invention relates to a system and method for efficiently providing finance rates, which may include, without limitation, retail finance rates and lease rates. In particular, this invention pertains to acquiring rate request information, generating finance rates based upon information including, but not limited to, the rate request information, and generating a rate sheet by automatically importing information from at least the generated finance rates and the rate request information.

BACKGROUND OF THE INVENTION

Automobile dealers often arrange for financing of vehicles for their customers as an additional service to selling automobiles. However, the automobile dealers do not have the resources to collect, manage, and enforce these finance contracts. Therefore, after entering into a finance contract with a customer, the automobile dealers look to resell the finance contract to a company in the business of financing, referred to herein as a "finance source," which may be a credit union, a bank, a captive finance company, etc. The rate at which a finance source purchases a finance contract from an automobile dealer affects the rate that the dealer charges the customer. The ability to offer competitive finance rates often impacts the volume of automobiles that a dealer is able to sell. Dealers often leverage attractive financing options to assist them in reducing inventory, when necessary, through the use of advertised financing programs. Such financing programs are offered through finance sources that are willing to guarantee particular rates of purchase from the dealer for the duration of the program. These guaranteed rates for a duration of time are referred to in the automobile finance industry as "rate programs."

Conventionally, rate programs are provided to dealers in a haphazard manner. Typically, requests for rate programs are initiated via email, telephone, or fax machine and have no standard format. For example, an employee of a finance source may generate and submit a request for a rate program via email to a colleague within the finance source that states, "Please provide me with a rate program from July 6 to July 14 for Ford Explorer® and Ford Taurus® automobiles." (Ford Explorer and Ford Taurus are registered trademarks of the Ford Motor Company). However, the employee may fail to mention particular automobile model numbers involved in the program or whether cash is available from the manufacturer that may be used to reduce rates. Consequently, the conventional process often results in many communications to identify all of the information needed to produce the requested rate program. This process results in time wasted by finance source employees, thereby reducing productivity and increasing costs.

In this conventional process, once a rate program request is received and all relevant information is identified, a rate program is developed. Finance source personnel then manually prepare spreadsheets with finance rates, referred to as "rate sheets," which indicate the rates that the financing source is willing to offer for the rate program. The rate sheet is then manually sent to one or more targeted automobile dealers, typically via facsimile. This cumbersome process wastes valuable time of finance source employees, reduces productivity, and increases costs. Accordingly, an improved rate program development system is needed in the art.

SUMMARY OF THE INVENTION

The problems of the conventional rate program process are addressed and a technical solution is achieved by the system and method for providing finance rate information disclosed herein. In particular, rate request information is acquired to develop a rate program for a client, which may be, without limitation, an automobile dealer. The rate request information may, for example, include a type of rate program requested, a region where the client is located, any applicable discounts, applicable financing terms, information describing the product to be financed, and minimum allowable credit ratings of the client's customers. The types of rate request information acquired can be tailored to the particular needs of the client and finance source involved. The rate request information may be acquired directly by way of a web-based form.

Once the rate request information is acquired, it may be stored in a tracking database for statistical purposes. The acquired request information is submitted to a rate generation system that generates rates based upon information including, but not necessarily limited to, the acquired request information. The generated rates are used to populate a template rate sheet that is then output in response to the rate request for use in connection with financing. The generated rates may be stored in a rate database that may be accessed when processing financing applications received in response to the rate program described by the rate sheet. Further, data in the tracking database may be accessed and updated when processing financing applications to keep track of the effectiveness of a rate program.

The above-described system and method reduces the amount of time that personnel need to spend processing rate program requests, thereby increasing productivity and reducing costs.

BRIEF DESCRIPTION OF THE DRAWINGS

A more complete understanding of this invention may be obtained from a consideration of this specification taken in conjunction with the drawings, in which:

FIG. 3 illustrates an example of a rate program request according to an embodiment of the invention; and FIG. 4 illustrates an example of a rate sheet generated according to an embodiment of the invention.

DETAILED DESCRIPTION OF THE EXEMPLARY EMBODIMENT(S) OF THE INVENTION

The invention provides an efficient end-to-end process of developing rate programs and facilitates tracking and reporting of developed rate programs and the financing applications processed under these programs. In particular, the invention acquires all designated information up front, allows for approval of the gathered information prior to initiating rate program development, and may store such information for tracking and/or reporting purposes. Once the designated information has been acquired, finance rates may be generated based at least upon the information. Generated finance rates may be used to populate computer-readable template rate sheets, which may be transmitted to the requestor, or other designated person or input. The invention reduces the amount of human interaction required to develop rate programs, thereby reducing costs, decreasing response times, and reducing error.

Although the invention is often described in the context of financing the purchase of automobiles, one skilled in the art will appreciate that the invention also applies to any type of financing where finance rate information is needed. For example, one skilled in the art will appreciate that the invention also applies to leases, and, in this case, that the rate generation system 105 (discussed below beginning with FIG. 1) may generate money factors. In other words, the term "finance rate," as used in this specification, is intended to include money factors used for leases. In the case of leases, one skilled in the art will appreciate that the information gathered, as shown, for example, at FIG. 3, may be modified to include residual value information and other information needed to generate money factors. In addition to leases, one skilled in the art will appreciate that the invention includes within its scope generating rate information for balloon financing, branch financing, retail financing, and retail installment contracts. Accordingly, the invention is not limited to any particular form of financing. One skilled in the art will also appreciate that the invention includes generating rate information for the insurance industry. Further, although described in the context of a finance source purchasing a finance contract from an automobile dealer, one skilled in the art will also appreciate that the invention applies to a dealer arranging for direct financing by the finance source to the customer.

Additionally, although described in the context of automobiles, one skilled in the art will appreciate that the invention includes within its scope the financing of airplanes, ships, recreation vehicles ("RVs"), all terrain vehicles (ATVs), Segways, Jet Skis, Waverunners, and any other transportation vehicles. Further, one skilled in the art will appreciate that the invention includes within its scope the financing of homes and any other type of property.

Figure 1:
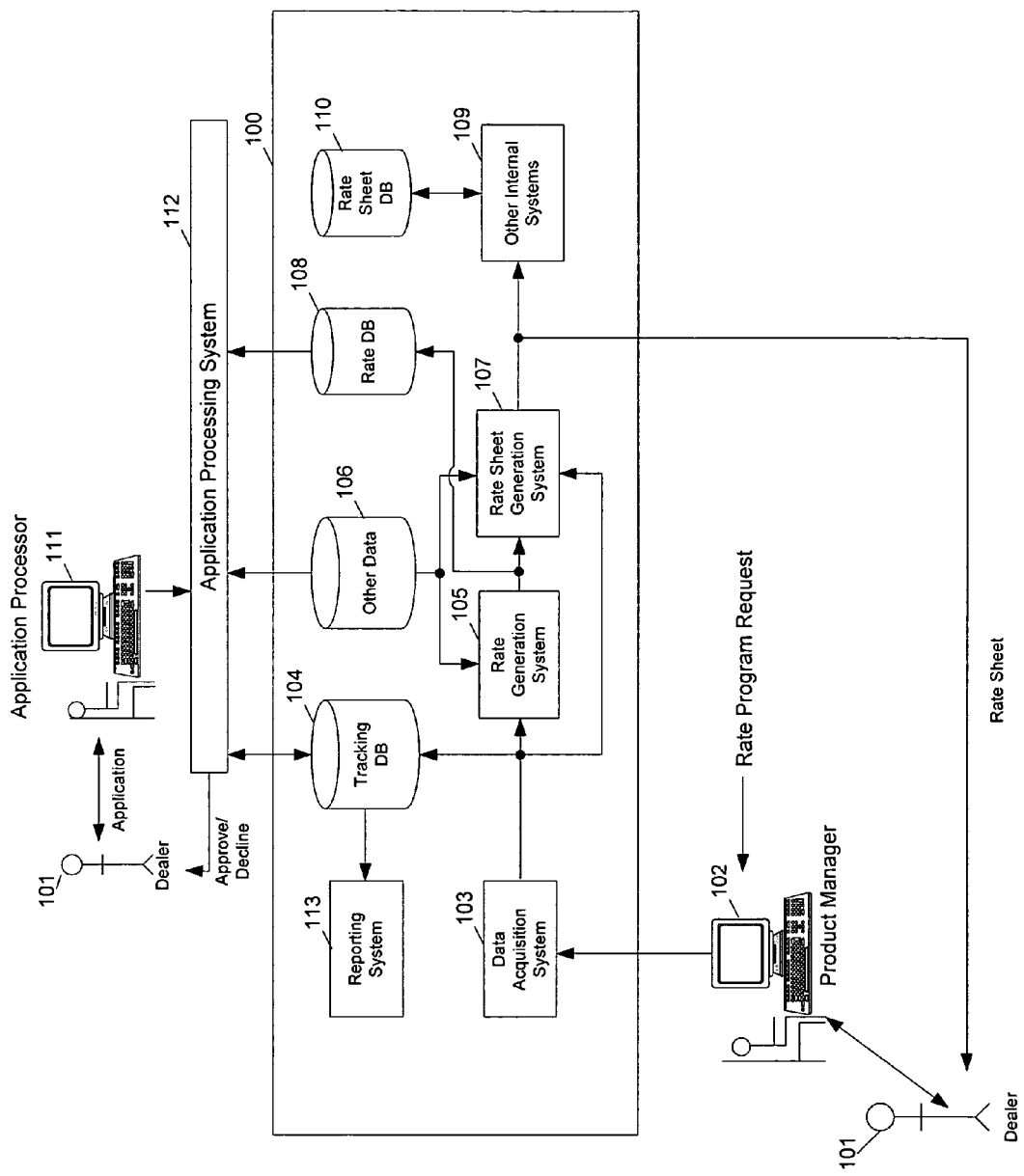
FIG. 1 illustrates a finance rate information generation system according to one embodiment of the invention.

FIG. 1 illustrates a finance rate information generation system 100 according to one embodiment of the invention. The system 100 includes several storage components 104, 106, 108, and 110, and several processes 103, 105, 107, 109, and 113. Although shown separately, one skilled in the art will appreciate that the storage components 104, 106, 108, and 110 may be located together or in groups in one or more computer-readable memories. For instance, the tracking database 104 may be stored in a computer-readable memory in one computer, and the rate database 108 may be stored in a computer-readable memory within another computer. Alternatively, the tracking database 104 and the rate database 108 may be stored in a single database in a single computer-readable memory in a single computer or data storage system. The term "computer-readable memory" is intended to include any computer-accessible data storage device, whether volatile or nonvolatile, electronic, optical, or otherwise, including but not limited to, floppy disks, hard disks, CD-ROMs, DVDs, flash memories, nonvolatile ROMs, and RAMs.

Additionally, although shown as separate logical databases, one skilled in the art will appreciate that the data represented by databases 104, 106, 108, and 110, may be stored together or in groups in one or more databases, and that the invention is not limited to how, where, or in what combinations such data is stored.

Further, although shown separately, one skilled in the art will appreciate that processes 103, 105, 107, 109, and 113 may be performed by a single computer or by a plurality of computers communicatively connected. For example, one computer may perform the processes of the data acquisition system 103, and another computer may perform the processes of the rate generation system 105 and the rate sheet generation system 107. Alternatively, a single computer may perform all three processes. The term "computer" is intended to include any data processing device, such as a desktop computer, a laptop computer, a personal digital assistant, or any other device capable of processing data or including a microprocessor. The term "communicatively connected" is intended to include any type of connection, whether wired or wireless, in which data may be communicated. Further, the term "communicatively connected" is intended to include connections between devices within a single computer, such as communication between a processor and a memory, or a connection between computers, such as communication between two computers on a wired or wireless network.

As illustrated in FIG. 1, a rate program request for a client, which may be, without limitation, an automobile dealer 101, is initiated and communicated to an employee of a finance source, such as a product manager 102. Typically, rate program requests are initiated from within the finance source from an internal marketing department, management, or other internal personnel. However, one skilled in the art will appreciate that the invention is not limited to the source of a rate program request.

The product manager 102 inputs data regarding the request into a data acquisition system 103. Alternatively, another entity (not shown), such as the rate program request initiator, may directly input data regarding the request into the data acquisition system 103 via a user-interface presented to him or her via a computer monitor. For example, the request initiator may log onto a web site distributed by the data acquisition system 103 that presents the request initiator with a form for inputting data regarding the request. One skilled in the art will appreciate that the invention is not limited to who or what inputs data regarding the request. Details regarding the data input process will be described below with reference to FIGS. 2 and 3.

Once the rate request information has been input into the data acquisition system 103, it is stored in a tracking database 104 for tracking and reporting purposes. The rate request information is also input into a rate generation system 105 that produces competitive rates that are acceptable to the financing source. An example of a rate generation process performed by the rate generation system 105 will be described in detail with reference to FIGS. 2A and 2B. The rate generation system 105 may receive other data 106 to facilitate generation of the rates. Such other data may include state specific rate laws or state specific product types. For example, regarding state specific product types, such other data may include whether particular states allow balloon financing. Such other data may also include data regarding previously offered rates, rates offered by competitors, rates by region, usury information, credit score tier breaks, information regarding compliance with state and federal regulations, and any other information that facilitates generation of the finance rates.

The generated rates may be stored in a rate database 108, which may be referenced by an application processing system 112 described below. The generated rates are fed into a rate sheet generation system 107 which uses the rates, the rate request information acquired by data acquisition system 103, and other data 106 to populate a computer-readable template rate sheet. This process of generating the rate sheet from a template will be described in more detail below with reference to FIGS. 2A and 4. The generated rate sheet may be transmitted to the dealer 101, other internal systems 109, as desired, and may be stored in a rate sheet database 110 for archival purposes.

Based on the received rate sheet, the dealer 101 now knows the lowest rate at which the financing source that provided the rate sheet will purchase a financing contract from the dealer 101. Accordingly, the dealer 101 can determine what financing rates (and, as applicable, allowable mark-ups) to charge his or her customers. For customers who desire to purchase an automobile with financing, the dealer submits an application for financing on behalf of the customer based upon the rate program generated by system 100. The application is submitted to an application processor 111. The application processor 111 then submits the application to an application processing system 112 to determine whether the finance source will purchase that contract based upon the customer's credit worthiness, and if so, what the terms of the financing are. The application processing system 112 may be any system known in the art for processing financing applications, except that the application processing system 112 is modified to interface with databases 104, 106, and 108. Application processing system 112 may include people, computers, or a combination of both.

To facilitate processing of the applications, the application processing system 112 may access the rate information stored in the rate database 108 and the other information stored in the database 106. As the applications are processed by the processing system 112, results may be stored in the tracking database 104 and tied to the associated rate program. For instance, the financing applications may be tagged with a request number (302 in FIG. 3, for example) to identify the rate program that corresponds to each financing application. Accordingly, reporting system 113 may tally all applications associated with each particular rate program to show, for example, the total financing amounts associated with each rate program. Over the course of time, reporting system 113 may also track default rates, early payoff rates, and other performance trends.

Figure 2A:
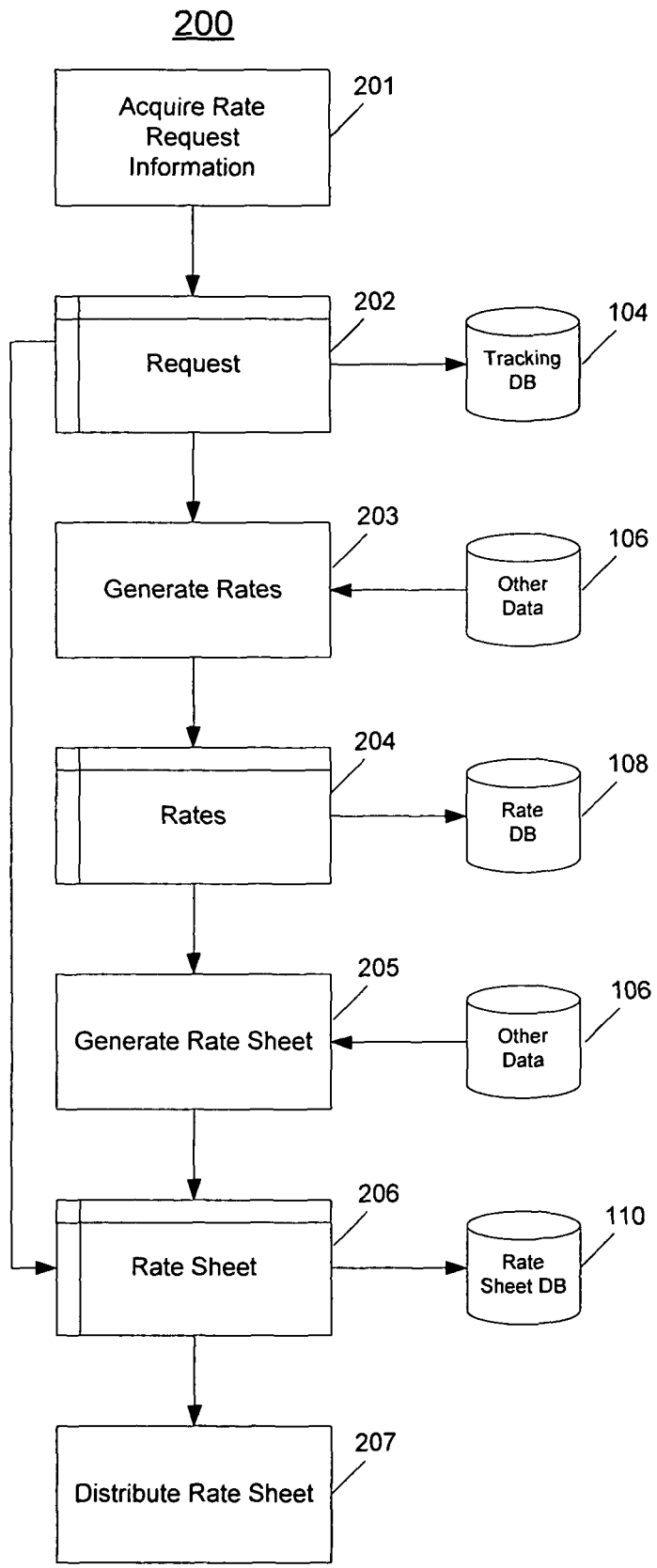
FIG. 2A illustrates processing performed by the rate information generation system according to an embodiment of the invention.

The process 200 of generating rates for rate programs performed by rate information generation system 100 will now be described in detail with reference to FIG. 2A. The process 200 begins with acquiring rate request information at 201, which is performed by data acquisition system 103. According to an embodiment of the invention, the rate request information acquired by system 103 is input via a form 300 shown, for example, with FIG. 3. As discussed earlier, an employee of the financing source, or some other individual, may fill out this form. In the example of FIG. 3, an employee of the financing source fills out the form, which may be a Microsoft Excel® spreadsheet. (Microsoft Excel is a registered trademark of the Microsoft Corporation.) The rate request information inputted into the form 300 may include requestor information 301, such as the name of the individual inputting the information. The rate request information may also include a request identifier 302 used for tracking the request and subsequently-generated rate program in the tracking database 104. Additional information may include the request origination location 303, which may also be used for reporting purposes in the tracking database 104. A promotional code 304 also may be included.

The form 300 may include the type of program requested, such as a state standard program 305, a special program 306, and a manufacturer subvention program 307. An example of a state standard program 305 may be offering a particular rate for an entire state for a period of time, such as 4.5% for New York for two weeks. An example of a special program 306 may be offering a particular rate for a particular city for a period of time, such as 4.25% for Buffalo for two weeks. An example of a manufacturer subvention program is when a manufacturer assists in providing a below-market rate for one or more of the manufacturer's automobiles. One skilled in the art will appreciate that these examples of program types are intended merely for illustration and that the invention is not limited to these or any particular types of programs.

Other information in the form 300 may include product information 308 describing the product or products involved in the rate program, which in the example of FIG. 3 is a Saturn® SL2 automobile, model years 2002-2005. (Saturn is a registered trademark of the Saturn Corporation.) Other program details may be included, such as the region and/or subregion to which the program applies 309, start and end dates for the rate program 310, finance terms 311, and discounts 312 associated with the rate program. Examples of discounts 312 include discounts applied to applications capable of efficient processing, such as applications capable of being signed electronically 313 and applications submitted through web-based forms, in this case, from a "Dealer-Track"® web site 314. (Dealer Track is a registered trademark of Dealertrack.com, Inc.) Discounts may also be applied to customers based on credit-worthiness that may be quickly or automatically approved, such as through a Chase Express® approval process 315. (Chase Express is a registered trademark of the Chase Manhattan Corporation, now JPMorgan Chase & Co.) Further, discounts may be applied to highly priced products, such as "Big Ticket" products 316 and "Super Luxury" products 317 defined in this example as luxury automobiles priced greater than $25,000, and $50,000, respectively. The request form 300 may also include information about acceptable credit risk 318, where minimum allowable credit scores, which may be FICO scores, for customers are identified.

Another aspect of the request form 300 pertains to volume versus yield information 319. In this box, the increase or decrease in volume expected by the dealer 101 during the rate program may be indicated. If the dealer 101 expects an increase in volume, the financing source may decide to lower rates by a certain percentage. Alternatively, if the dealer 101 expects decreased volume, the financing source may decide to increase rates by a certain percentage. In the example at box 319, the dealer 101 expects an increase in volume of $5 million, and in response, the financing source will lower its buy rate to the dealer by 2 basis points. Because this information is stored in the tracking database, it can later be reviewed to determine whether the expected increase in volume came to fruition.

Additional information on the request form 300 may include the channel 320 by which the dealer 101 is to receive the generated rate sheet describing the rate program, such as by facsimile, email, web site, or a personal digital assistant ("PDA"). The request form 300 may also include approval information 321 where one or more supervisors input their initials when they have reviewed and approved the request form 300. The form 300 may also include formatting information 322 that describes the appearance of the generated rate sheet. For example, the formatting information 322 may indicate that the rate sheet should have a summer theme with images of the sun. The foregoing are examples of types of information that may be included. Rate request information may be tailored to the specific needs of the financing source or other system owner or user.

Returning to FIG. 2A, after the rate request information 202 has been acquired at 201, it is input into the tracking database 104. The acquired request information 202 and, optionally, some other data 106, are used to generate rates 204 at 203. The other data 106 may include state specific rate laws or product types, including, without limitation, whether a particular state allows balloon financing. The other data 106 may also include market value information pertaining to the product 308, such as a current market value of the Saturn SL2 automobile identified in FIG. 3.

Figure 2B:
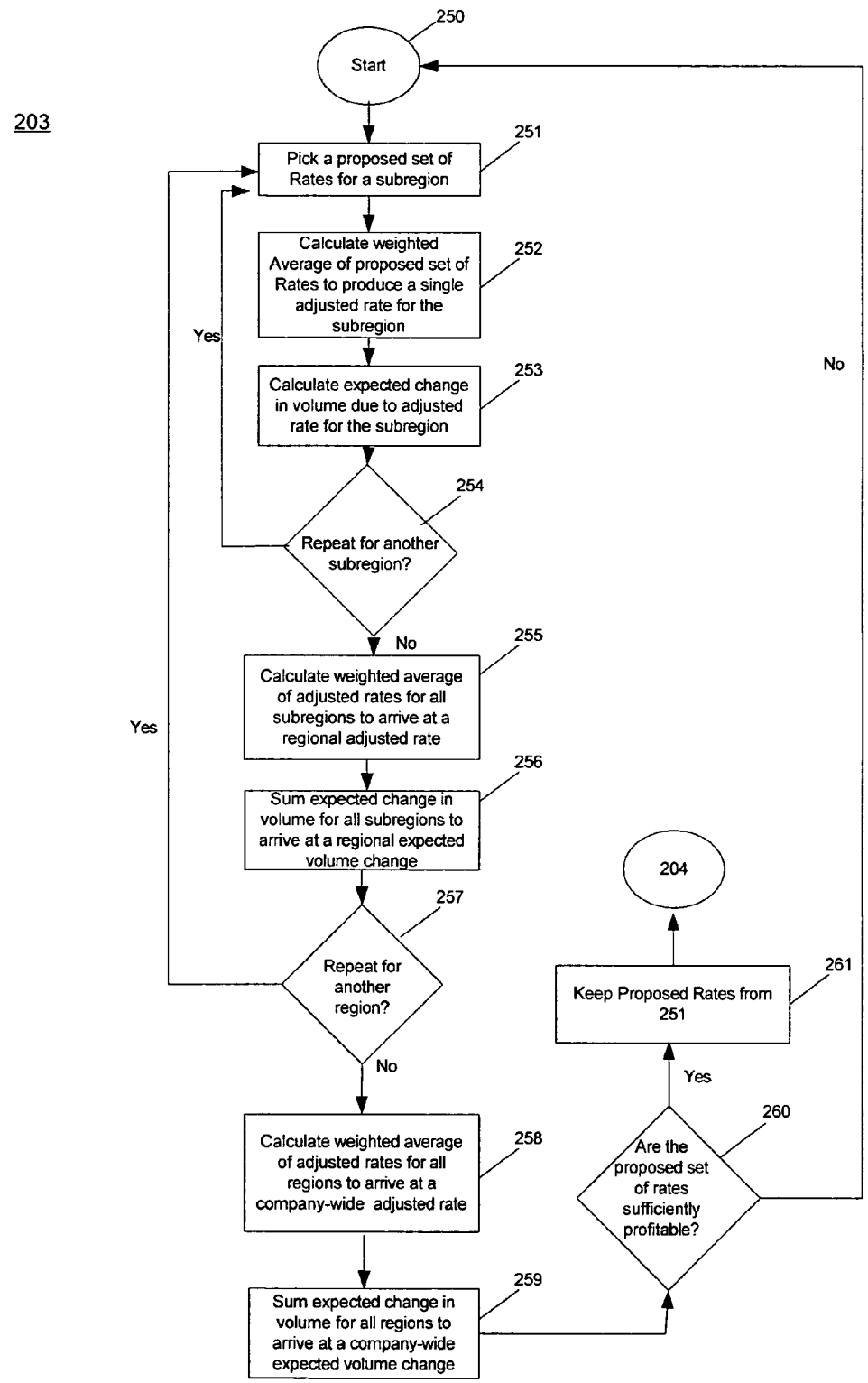
FIG. 2B illustrates rate generation processing performed by the rate information generation system according to an embodiment of the invention.

The functions performed at step 203 according to an embodiment of the invention, which are implemented by the rate generation system 105, will now be described with reference to FIG. 2B. It is to be understood, however, that FIG. 2B and its accompanying description is merely an illustration of one process of generating rates, and that one skilled in the art will appreciate that any rate generation process may be used. Further, although FIG. 2B is described in the context of subregions, such as states, and regions, such as "northeast," one skilled in the art will appreciate that the rate generation process 203 is not limited to this calculation structure.

At 250, the process of generating rates begins. At 251, based at least upon other data 106, which may include historical data, product information, current rates, competitors' rates, maximum and minimum allowable rates, and desired volume changes, a proposed set of rates is determined. For example, if it is desirable that volume (in dollars) increase 5%, historical data may be referred to, such as last month's volume (in dollars) and data describing historical volume increases as a function of rate change, to determine proposed rates for the next month. Such rates may appear, for example, as shown in Table I below:

TABLE I

| New Jersey | | |
|---|---|---|
| 2005 & 2004 | Express | 4.14% |
| 60 mos | 700+ | 4.29% |
| | 680-699 | 4.64% |
| | 660-679 | 4.79% |
| | 620-659 | 10.06% |
| | <620 | 14.56% |
| 66 months | 700+ | 4.79% |
| 72 months | 700+ | 5.29% |

As shown in Table I, such rates may be associated with product years, such as year 2005 and year 2004 automobiles; financing terms, such as 60 months, 66 months, and 72 months; credit score tiers, such as a FICO score of greater than or equal to 700, 680-699, etc. . . . ; and applicable discounts, such as Chase Express ("Express" in Table I). Further, in one embodiment, the proposed set of rates determined at 251 are associated with a particular subregion, such as the state of New Jersey, as shown in Table I.

At 252, a weighted average of the proposed rates from 251 is calculated, thereby producing a single adjusted rate for the subregion. The weighted average may account for volume (in dollars) and profits associated with each product, financing terms, credit score tiers, etc. An example of the single adjusted rate for a subregion, in this case a state, is shown in Table II below.

TABLE II

| State | Adjusted Rate |
|---|---|
| New Jersey | 4.42% |

At 253, an expected change in volume (in dollars) for the subregion over a period of time due to the single adjusted rate from 252 is calculated. Such calculation may be based upon the other data 106, which may include the historical data that may have been referenced at step 251. An example of such expected change in volume may appear as shown in Table III below.

TABLE III

| State | Expected Volume Change over Next Month |
|---|---|
| New Jersey | $20,814,158 |

At 254, steps 251-253 are repeated for all other subregions within a region, if necessary. If a particular subregion does not require proposed new rates, i.e., rates will stay the same for that subregion, step 251 may be skipped and steps 252 and 253 performed based upon existing rates that are to remain unchanged. Accordingly, upon completion of steps 251-253 for all subregions, a single adjusted rate (from 252) and an expected change in volume (in dollars) (from 253) are calculated, as shown, for example, with Table IV below.

TABLE IV

| State | Adjusted Rate | Expected Volume Change over Next Month |
|---|---|---|
| New Jersey | 4.42% | $20,814,158 |
| Connecticut | 4.45% | $0 |
| New York | 4.39% | $25,341,889 |

At 255, a weighted average of adjusted rates for all subregions is calculated, thereby arriving at a regional adjusted rate. For example, the adjusted rate data in Table IV is averaged in a weighted fashion to arrive at a regional adjusted rate, as shown, for example, in Table V. The weighted average may account for historical volume (in dollars) and profits associated with each subregion. At 256, the expected volume changes for each subregion are summed, thereby arriving at a regional expected volume change. For example, the expected volume change data in Table IV is summed to arrive at a regional expected volume change, as shown, for example, in Table V below.

TABLE V

| Region | Adjusted Rate | Expected Volume Change over Next Month |
|---|---|---|
| Northeast | 4.41% | $46,156,047 |

At 257, steps 251-256 are repeated for all other regions, if necessary. Therefore, upon completion of steps 251-256 for all regions, a single adjusted rate (from 255) and an expected change in volume (in dollars) (from 256) are calculated, as shown, for example, with Table VI below.

TABLE VI

| State | Adjusted Rate | Expected Volume Change over Next Month |
|---|---|---|
| Northeast | 4.41% | $46,156,047 |
| Southeast | 4.43% | $38,272,561 |

At 258, a weighted average of adjusted rates for all regions is calculated, thereby arriving at a company-wide adjusted rate. For example, the adjusted rate data in Table VI is averaged in a weighted fashion to arrive at a company-wide adjusted rate, as shown, for example, in Table VII. The weighted average may account for historical volume (in dollars) and profits associated with each region. At 259, the expected volume changes for each region are summed, thereby arriving at a company-wide expected volume change. For example, the expected volume change data in Table VI is summed to arrive at a company-wide expected volume change, as shown, for example, in Table VII below.

TABLE VII

| Company-Wide | |
|---|---|
| Adjusted Rate | Expected Volume Change over Next Month |
| 4.42% | $84,428,608 |

At 260, it is determined whether the company-wide adjusted rate and expected volume change are sufficiently profitable, which may be based at least upon known operating costs and historical information included in other data 106. If the company-wide adjusted rate and expected volume change are deemed sufficiently profitable at 260, the rates proposed at step 251 (Table I, for example) are used as generated rates 204. If the company-wide adjusted rate and expected volume change are deemed not sufficiently profitable at 260, the entire process of FIG. 2B is repeated and processing returns to step 250 where different proposed rates are chosen at 251.

Returning to FIG. 2A, the generated rates 204 are stored in rate database 108 for the reasons previously discussed. The generated rates 204, the acquired request information 202, and other data 106, may be used to generate a rate sheet 206 as an output of process 205. The other data 106 includes a template rate sheet to be populated with the generated rates. Advantageously, other data 106 includes a plurality of template rate sheets, each specific to a particular type of rate program, region, or client, where the particular rate sheet to be used for the current rate program is determined based upon the acquired request information 202.

Generation of the rate sheet 206 is performed by the rate sheet generation system 107, and will be described in detail with reference to FIG. 4. FIG. 4 illustrates a rate sheet 400 generated by the rate sheet generation system 107. The rate sheet 400 is used as an example only, and does not necessarily correspond with the example request 300 described with reference to FIG. 3 or the generated rates shown in the example of Table I. In its computer-readable form, the rate sheet 400 may be a Microsoft Excel spreadsheet with particular data cells or fields where the rate information 204, the request information 202, and other data 106 are inserted. For instance, the rate sheet 400, prior to population, may have the fields pertaining to data 402-432 (even numbers only) blank, where the rate sheet generation system 107 fills in these blank fields with the request information 202, the rate information 204, and the other data 106. For example, if the region information 309 in FIG. 3 indicates a subregion of New Jersey, the rate sheet generation system 107 could insert "New Jersey" into field 402 as shown in FIG. 4. On the other hand, however, data field 402 could be fixed as "New Jersey" so that this particular template rate sheet would apply only to rate programs for the New Jersey region. In this scenario, the request information 202 is queried to determine what the subregion is, and based upon this subregion, the appropriate template rate sheet is selected from the database 106.

Data fields capable of being populated may include effective date information 404, 406, and 408, which is based upon the date information 310 from FIG. 3. Fields 410 and 412 may be populated based upon the product information 308. Rate information 414 and 416 may be populated based upon the rate information 204 as well as the minimum allowable credit rating information 318. The "maximum advance" information 418 and 420 may be inserted from the generated rate information 204 and the allowable financing terms 311.

In the example of FIG. 4, the "Advance," "Service Contracts," and "GAP" terms 422, 424, and 426, respectively, are terms that apply to all rate programs as determined by corporate policy, and are inserted from the other data 106. An advance is financing in excess of the value of the underlying asset. For example, financing of $10,500 may be allowed on an asset worth $10,000. A service contract is an agreement between the consumer, e.g., the automobile purchaser, and a third party to provide services to the consumer. A bumper-to-bumper warranty on an automobile is an example of a service contract. The fee for a service contract may be paid for by financing. GAP is a dept cancellation instrument paid for by the consumer and provided by a third party to cover the difference between the value of the vehicle due and the then-outstanding amount due if the vehicle is totaled or stolen and not recovered.

Information from the "available discounts" field 428 may be populated based upon the discount information 312. Flat fee information 430, which describes the fees provided to the dealer 101 if the dealer 101 offers the customer the rates shown in 414 and 416 without any markup, may be inserted from the other data 106. However, if these fees are standard for all rate programs, they may be fixed as part of the template. Area 432 may be reserved for information regarding any current marketing programs and may be inserted from other data 106.

The rate sheet 400 also may have data fields or formatting characteristics that are fixed as part of the template. For example, contact information 434 may be fixed because such information is typically constant between rate programs. Further, standard terms 436 that are typically constant between rate programs may also be fixed as part of the template rate sheet. Descriptive language supporting insertable data fields are advantageously fixed. For example, the language "Effective on Contracts dated" shown at 438 in support of the insertable July 15$^{th}$ date at 404, may be fixed as part of the template. Formatting aspects of the rate sheet 400 are also fixed, such as the formatting of the box-structures 440 around the rate information.

It is to be understood that the exemplary embodiments are merely illustrative of the present invention and that many variations of the above-described embodiments can be devised by one skilled in the art without departing from the scope of the invention. For instance, regarding FIG. 4, one skilled in the art will appreciate that the particular combination of which data fields have data inserted into them and which data fields are fixed may depend upon the particular policies chosen by the financing source generating the rate program. Accordingly, one skilled in the art will appreciate that the invention is not limited by which particular fields are fixed and which have data inserted into them or by the types or arrangement of the particular data fields. It is intended that any and all variations be included within the scope of the following claims and their equivalents.

What is claimed is:

1. A method for developing finance rate information for a product being sold, the method comprising:
    acquiring rate request information, the rate request information comprising information used to generate finance rates, the information comprising the type of rate program requested, and a predicted change in volume of the product being sold within at least one geographic entity during a rate program period;
    storing the rate request information in a computer-readable memory;
    generating finance rates based upon the rate request information, the finance rates being generated based on a proposed set of rates and the predicted change in volume of the product being sold within the at least one geographic entity during the rate program period, the generated finance rates and total predicted volume change corresponding to a profitability level, the generated finance rates and total predicted volume change being recalculated with a different proposed set of rates until the profitability level is above a predetermined threshold;
    generating, with a computer, a rate sheet by importing information including the generated finance rates and the rate request information; and
    transmitting the rate sheet.

2. The method of claim 1 wherein the rate request information further comprises applicable financing durations, information describing a product to be financed, and applicable customer credit ratings.

3. The method of claim 1 wherein the rate request information comprises residual value information.

4. The method of claim 1 wherein the rate request information is stored in a tracking database to facilitate tracking financing applications associated with the acquired rate request information.

5. The method of claim 4 wherein information pertaining to a financing application associated with the acquired rate request information is stored in the tracking database.

6. The method of claim 5 further comprising generating reports based upon data in the tracking database.

7. The method of claim 1 further comprising storing the generated finance rates in a computer-readable memory.

8. The method of claim 7 wherein the generated finance rates are stored in a rate database for providing the generated finance rates to an application processing system.

9. The method of claim 1 further comprising storing the rate sheet in a computer-readable memory.

10. The method of claim 9 wherein the rate sheet is stored in a rate sheet database for archiving purposes.

11. The method of claim 1 wherein the finance rates are money factors.

12. The method of claim 1 wherein the rate sheet provides information regarding financing a vehicle.

13. The method of claim 12 wherein the vehicle is an automobile, a truck, a motorcycle, a recreational vehicle, an all-terrain vehicle, a Segway, a boat, a jet ski, or a waverunner.

14. The method of claim 1 wherein the finance rates are automotive finance rates.

15. The method of claim 1 wherein the rate sheet provides information regarding financing a home.

16. The method of claim 15 wherein the home is a house, a mobile home, a townhouse, or an apartment.

17. A system for developing finance rate information for a product being sold, the system comprising:
    a data acquisition system for acquiring rate request information, the rate request information comprising information used to generate finance rates, the information comprising the type of rate program requested, and a predicted change in volume of the product being sold within at least one geographic entity during the rate program period;
    a rate generation system communicatively connected to at least the data acquisition system for generating finance rates based upon the rate request information, the finance rates being generated based on a proposed set of rates and the predicted change in volume of the product being sold within the at least one geographic entity during the rate program period, the generated finance rates and total predicted volume change corresponding to a profitability level, the generated finance rates and total predicted volume change being recalculated with a different proposed set of rates until the profitability level is above a predetermined threshold; and
    a rate sheet generation system communicatively connected to at least the rate generation system for generating a rate sheet by importing information including the generated finance rates and the rate request information.

18. The system of claim 17 wherein the rate request information further comprises applicable financing durations, information describing a product to be financed, and applicable customer credit ratings.

19. The system of claim 17 wherein the rate request information comprises residual value information.

20. The system of claim 17 further comprising a tracking database communicatively connected to at least the data acquisition system for storing the rate request information to facilitate tracking financing applications associated with the acquired rate request information.

21. The system of claim 20 wherein information pertaining to a financing application associated with the acquired rate request information is stored in the tracking database.

22. The system of claim 21 further comprising a reporting system communicatively connected to at least the tracking database for generating reports based upon data in the tracking database.

23. The system of claim 17 further comprising a rate database communicatively connected to at least the rate generation system and an application processing system for storing the generated finance rates and facilitating processing of financing applications by the application processing system.

24. The system of claim 17 further comprising a rate sheet database communicatively connected to at least the rate sheet generation system for storing the generated rate sheet.

25. The system of claim 17 wherein the finance rates are money factors.

26. The system of claim 17 wherein the rate sheet provides information regarding financing a vehicle.

27. The system of claim 26 wherein the vehicle is an automobile, a truck, a motorcycle, a recreational vehicle, an all-terrain vehicle, a Segway, a boat, a jet ski, or a waverunner.

28. The system of claim 17 wherein the finance rates are automotive finance rates.

29. The system of claim 17 wherein the rate sheet provides information regarding financing a home.

30. The system of claim 29 wherein the home is a house, a mobile home, a townhouse, or an apartment.

31. A method for developing finance rate information for a product being sold, the method comprising:
    acquiring rate request information, the rate request information comprising information used to generate finance rates including information comprising the type of rate program requested, and a predicted change in volume of the product being sold within at least one geographic entity during a rate program period;
    storing the rate request information in a computer-readable memory to facilitate generating reports regarding financing applications associated with the acquired rate request information;
    generating finance rates based upon the rate request information;
    storing the generated finance rates in a computer-readable memory for providing the generated finance rates to an application processing system;
    generating a rate sheet by importing information including the generated finance rates and the rate request information;
    storing the rate sheet in a computer-readable memory; and
    transmitting the rate sheet.

32. A system for developing finance rate information for a product being sold, the system comprising:
    a data acquisition system for acquiring rate request information, the rate request information comprising information used to generate finance rates including information comprising the type of rate program requested, and a predicted change in volume of the product being sold within at least one geographic entity during a rate program period;
    a tracking database communicatively connected to at least the data acquisition system for storing the rate request information to facilitate generating reports regarding financing applications associated with the acquired rate request information;
    a reporting system communicatively connected to at least the tracking database for generating reports based upon data in the tracking database;
    a rate generation system communicatively connected to at least the data acquisition system for generating finance rates based at lest upon the rate request information;
    a rate database communicatively connected to at least the rate generation system and an application processing system for storing the generated finance rates and facilitating processing of financing applications by the application processing system;
    a rate sheet generation system communicatively connected to at least the rate generation system for generating a rate sheet by importing information including the generated finance rates and the rate request information; and
    a rate sheet database communicatively connected to at least the rate sheet generation system for storing the generated rate sheet.

33. The method of claim 1, wherein the rate sheet is transmitted electronically.

34. The method of claim 31, wherein the rate sheet is transmitted electronically.

35. The system of claim 17, wherein the rate sheet generation system transmits the rate sheet electronically.

36. The system of claim 32, wherein the rate sheet generation system transmits the rate sheet electronically.

37. The system of claim 1, wherein the rate sheet is populated on a client's system.

38. The system of claim 17, wherein the rate sheet is populated on a client's system.

39. The system of claim 31, wherein the rate sheet is populated on a client's system.

40. The system of claim 32, wherein the rate sheet is populated on a client's system.

* * * * *